Figure 1:
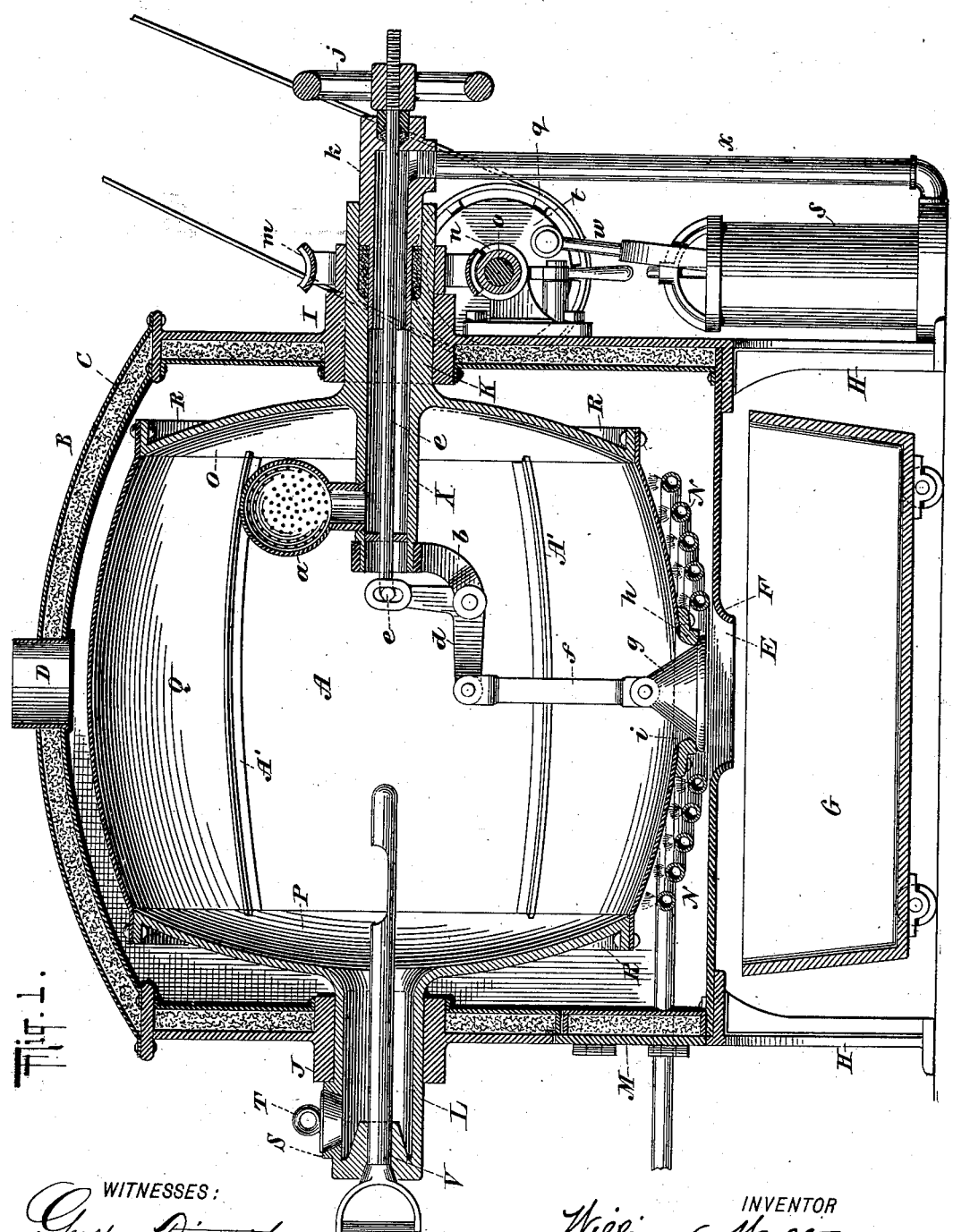

No. 661,568. Patented Nov. 13, 1900.
W. WALTER.
COFFEE ROASTER.
(Application filed Apr. 14, 1899.)
(No Model.) 2 Sheets—Sheet 1.

WITNESSES:
Gustave Dieterich
John Kehlenbeck

INVENTOR
William Walter,
BY
Chas. C. Gill
ATTORNEY

THE NORRIS PETERS CO., PHOTO-LITHO., WASHINGTON, D. C.

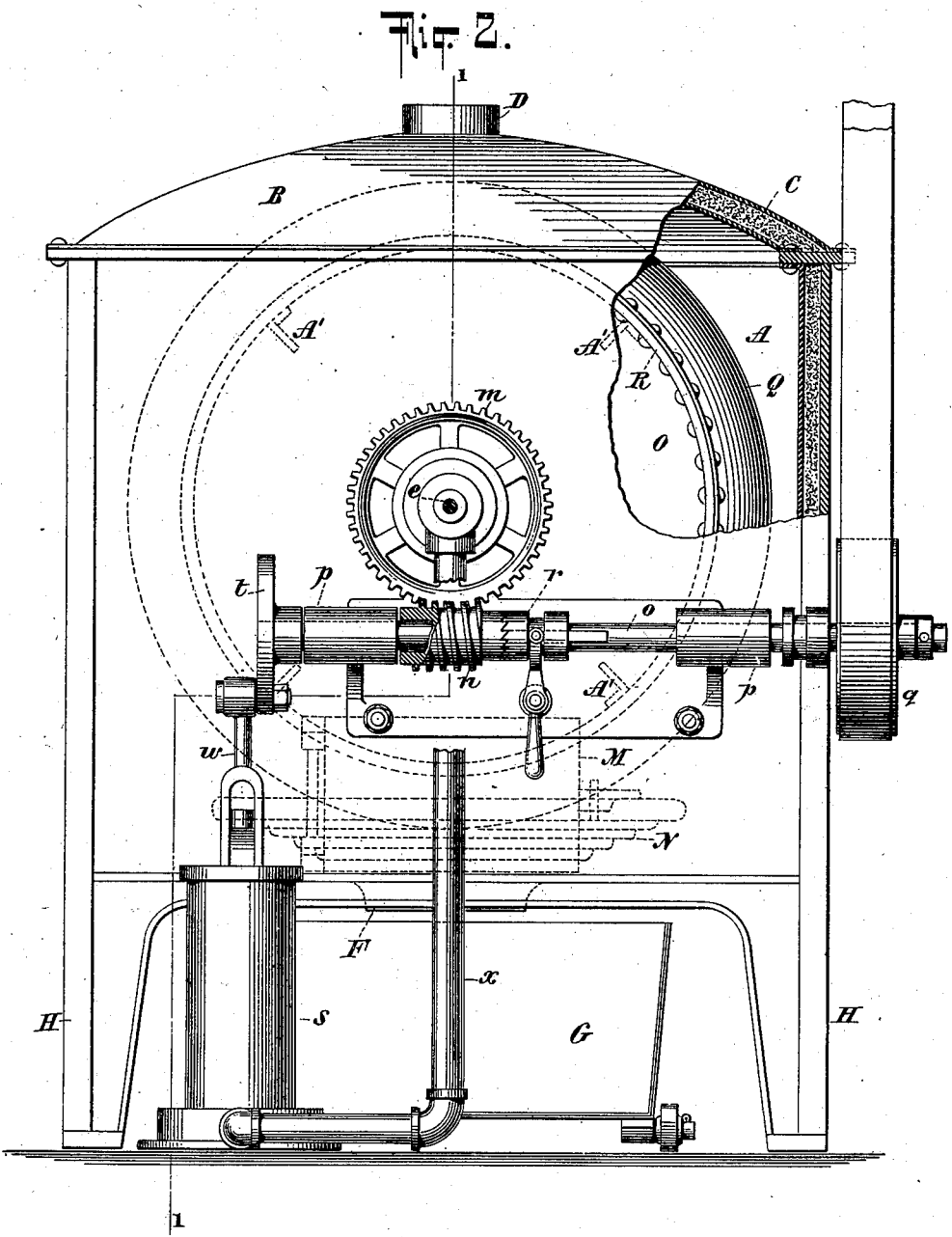

UNITED STATES PATENT OFFICE.

WILLIAM WALTER, OF NEW YORK, N. Y.

COFFEE-ROASTER.

SPECIFICATION forming part of Letters Patent No. 661,568, dated November 13, 1900.

Application filed April 14, 1899. Serial No. 712,963. (No model.)

*To all whom it may concern:*

Be it known that I, WILLIAM WALTER, a citizen of Switzerland, and a resident of New York, (Rosebank,) in the county of Richmond and State of New York, have invented certain new and useful Improvements in Apparatus for Roasting Coffee, Cocoa, and other Materials, of which the following is a specification.

The invention relates to improvements in roasters for cocoa-beans, coffee, and other substances; and it consists in the novel features and combinations of parts hereinafter described, and particularly pointed out in the claims.

I present my invention in this application as embodied in a roaster comprising an exterior casing, a revoluble roasting-cylinder applied within said casing, means for effecting the roasting of the coffee by the use of gas, means for withdrawing the air, gases, and like substances from the roasting-cylinder during the operation of the latter, means for revolving the roasting-cylinder, and means for effecting the discharge of the coffee or other material from the roasting-cylinder.

One object of the invention is to provide a roasting-cylinder of novel form wherein during the operation of the roaster the cocoa-beans, coffee, or other substances under treatment will not become broken and to effect as far as may be a vacuum within the revoluble roasting-cylinder in order thereby to effect an improvement in the roasted product and to economize time in carrying on the roasting operation.

A further object of my invention pertains to providing efficient and convenient means for carrying out the general purposes of the invention.

These objects, with the detail of the construction and operation of the roaster as a whole, will appear from the description hereinafter presented, reference being had to the accompanying drawings, forming a part of this application, and in which—

Figure 1 is a vertical longitudinal section through an apparatus constructed in accordance with and embodying the invention, the section being on the dotted line 1 1 of Fig. 2, which is a front end view, partly broken away, of same.

In the drawings, A designates the revoluble roasting-cylinder, and B the exterior casing within which said cylinder is mounted. The casing B will be formed of metal and of double thickness, so that its walls may contain an interposed layer of asbestos C or other non-conducting material. The casing B will be provided with a suitable outlet-flue D, and in its metal bottom the casing B will be formed with the outlet-opening E, surrounded by the downwardly-curved annular flange F, which will direct the coffee or other substance discharged from the cylinder A into a portable box or other receptacle G, passed below the casing B. The casing B will be mounted upon suitable frames or legs H, so as to admit of the passage below the opening E of the said box or receptacle G. The outer walls of the ends of the casing B will preferably be formed of cast metal and have the tubular bearing-hubs lettered I J, respectively, to receive the tubular hubs lettered K L, respectively, of the cylinder A. One end of the casing B will be provided with a suitable door M, leading to the chamber below the cylinder A, in which chamber is placed the coil of pipe N for the gas, this pipe being suitably perforated below said cylinder in order to provide for the ignition and combustion of the gas and constituting the gas-burner for effecting the roasting of the cocoa, coffee, or other substance placed within the cylinder A.

The cylinder A is of novel form and construction and is composed of the two ends lettered O P, respectively, and the middle or body portion Q, whose edges are secured to the annular edges of the ends O P. The ends O P will preferably be formed of cast metal and the body portion Q of sheet metal, the latter being in one continuous piece, with its meeting edges brazed together to form a substantially smooth seamless joint. The body portion Q presents concave inner surfaces, and likewise the ends O P present concave inner surfaces, which merge into the concave surfaces of the body portion Q and form a continuation of the surfaces of the portion Q, but are at an angle to the same, so as not to transfer the interior surface of the cylinder A into a sphere. The interior surfaces of the cylinder A have been given the special form illustrated in the drawings for the particular purpose of avoiding the globular outline of a sphere and the plain parallel surfaces of a true cylinder, and the object of thus shaping the inner surfaces of the cylinder A is to provide a roasting-cylinder which will effect a uniform roasting of the material without any tendency to fracture the cocoa-beans, coffee, or other substances under treatment.

The ends O P of the roasting-cylinder are preferably cast with the tubular hubs K L and with the outwardly-turned annular flanges R, to which the outer flanged edges of the body portion Q are riveted, and the tubular hub L will preferably be formed with the inlet-opening S for the substance to be introduced into the cylinder A, the said opening being provided with a suitable plug or closure T. The tubular hub L will also preferably be provided with an aperture V to receive a suitable device W, adapted to fill said aperture and to be utilized for withdrawing samples of the cocoa, coffee, or other substance under treatment whenever desired.

The tubular hub K is mounted within the bearing-hub I and is in alinement with the inwardly-projecting sleeve X, cast with the head O. The sleeve X supports the perforated spherical dome a, through which the gases and like matters are extracted, and also the bracket b, supporting the bell-crank lever d, whose upper arm is connected with the valve-rod e and whose lower arm is pivotally connected with the link f, suspending in a pivotal manner at its lower end the cone-shaped valve g. The valve g has its lower flanged edges exterior to the cylinder A, and said flanged edges are adapted to be seated against the flange h, applied to the exterior of the cylinder A and encompassing the discharge-opening i for said cylinder. The valve g is shown in its closed position in Fig. 1, and is simply lowered from the seat h when it is desired that the coffee or other roasted substance shall pass through the opening i and thence flow through the opening E in the bottom of the casing B and enter the receptacle G. During the roasting of the coffee or other substance the valve g is held in its closed position. (Shown in Fig. 1.) The valve g is held in its upper or closed position by means of the hand-wheel j, whose screw-threaded hub engages the thread cut upon the outer end of the valve-rod e. By turning the wheel j in one direction it will pass outward upon the valve-rod e and allow said rod to move inward and lower the valve g, and by turning said hand-wheel in the opposite direction it will draw the valve-rod e outward and elevate the valve g to its closed position and there maintain it. The valve-rod e passes through the sleeve X and hub K and thence through the tubular sleeve k, which at its inner end is introduced into the hub K and is packed as a gland, as shown in Fig. 1. The hub K extends outward beyond the hub I of the casing B and has mounted upon it the pinion-wheel m, to which power is applied and through which said power is communicated to the hub K and roasting-cylinder A for revolving the latter, the hub K turning within the bearing-hub I of the casing B and upon the sleeve k. The means for applying power to the pinion-wheel m is more clearly illustrated in Fig. 2, in which it will be seen that the pinion-wheel m is adapted to be engaged by the worm n on the driving-shaft o, the latter being mounted in bearings p and provided with the usual belt-wheel q. The worm n is loose upon the shaft o, and said shaft is provided with an ordinary form of clutch r to engage the worm n and effect the locking of said worm to said shaft. When the clutch r is in engagement with the worm n, the latter will turn with the shaft o and communicate the motion of said shaft to the pinion m and roasting-cylinder A. When, however, the clutch r is free of the worm n, the shaft may continue its rotation without affecting the pinion-wheel m, the cylinder A at such time remaining at rest. I utilize the shaft o as a means in connection with an ordinary pump s for creating as near as may be a vacuum within the roasting-cylinder A during the rotation of the latter or after the latter has come to a rest or for drawing the coffee or other substance into the cylinder A through the inlet-opening S. Upon the end of the shaft o is provided the crank-wheel t, which operates the usual piston-rod w of the pump s. The pump s is connected by the pipe x with the sleeve k, and hence the pump s through the pipe x is in communication with the interior of the roasting-cylinder A and may be utilized to withdraw the air, gases, smoke, and like substances or fluids from said cylinder. By freeing the clutch r from the worm n the pump s may be put into operation before the cylinder A commences to rotate, and by the like means the pump s may be continued in operation after the cylinder A ceases to revolve.

The interior surfaces of the cylinder A may, if desired, be provided with a few narrow blades A' for aiding in drawing the coffee or other substance under treatment up around the sides of the cylinder A during the rotation of the latter and to prevent the coffee or other material from remaining an undue length of time at the lower side of said cylinder, these blades having the effect of securing a more uniform roasting of the coffee or other substance.

In the operation of the apparatus hereinbefore described the valve g will be closed and the pump s set in motion, the clutch r being free from the worm n, and thereupon, the plug or closure F being withdrawn from the inlet-opening S, the coffee or other material to be roasted will be introduced into said opening S and by the action of the pump s be drawn by suction into the cylinder A. After the substance to be treated has been introduced in the cylinder A the inlet-opening S will be closed, the gas ignited, the pump s continued in operation, and the cylinder A be set in motion by the engagement of the clutch *r* with the worm *n*, the result being that the cylinder A will have a uniform gradual rotation and that the coffee or other substance will be roasted, the pump *s* continuing to constantly withdraw the gases, smoke, and other foreign matter from the cylinder A. The operation above indicated will be continued until the coffee or other substance has been sufficiently roasted, and thereupon the gas will be turned off and the cylinder A stopped in its motion either at once or after the coffee has to some degree been cooled. When it is desired to remove the coffee or other substance from the cylinder A, the pump *s* will be stopped by cutting off the power from the shaft *o*, and thereupon by the action of the hand-wheel *j* the valve *g* will be permitted to lower and open the outlet-opening *i*, through which the coffee or other substance will then descend into the receptacle G.

As above explained, the form of the cylinder A, I regard as of importance, and in addition to the other features of construction hereinbefore pointed out I regard the combination of a revoluble roasting-cylinder, without limitation as to its special form, with means for extracting the air, gases, smoke, and other foreign matter from the cylinder during the revoluble action of the latter as of the utmost importance and as new. The action of the pump *s* during the revoluble motion of the cylinder A removes all deleterious matter from the cylinder A and not only expedites the roasting of coffee, cocoa, or other substance, but leaves the coffee, cocoa, or other substance in a much greater degree of desirability as to aroma and other conditions than would be the case if the pump *s* or some equivalent suction apparatus were not employed.

What I claim as my invention, and desire to secure by Letters Patent, is—

1. In a roaster, the revoluble cylinder comprising the concave ends O, P, and the shallow-bellied regularly-curved body portion Q, having an outlet for the material to be roasted, said ends O, P, having the annular flanges R and hollow hubs K, L, the latter of which has the inlet with means for closing the same, and said body portion Q being secured at its ends to said flanges R, combined with means connected with said hub K for exhausting the gases, smoke and foreign matter through the same, and means for rotating said cylinder; substantially as set forth.

2. In a roaster, the revoluble roasting-cylinder having the hollow hubs K, L, the latter of which has the inlet with means for closing the same, combined with means for rotating said cylinder, a suction or exhaust pump connected with said hollow hub K for extracting the gases, smoke and foreign matter from said cylinder during the rotation of the latter, and means for operating said pump, said cylinder except at said hub K being, when said inlet is closed, substantially sealed or airtight; substantially as set forth.

3. In a roaster, the revoluble roasting-cylinder having an inlet and an outlet, and provided with a valve whose closing edges are exterior to the cylinder for closing said outlet, combined with the valve-rod extending through the hub of said cylinder, lever connections intermediate said valve-rod and said valve for controlling the same, and means for controlling the movement of the said rod; substantially as set forth.

4. In a roaster, the roasting-cylinder, comprising the ends O, P, and the body portion Q, said ends being formed with the hubs and annular flanges R, and said body portion being secured to said flanges, combined with the casing in which said hubs are journaled, the valve controlling the outlet from said cylinder and having its sealing-flange exterior thereto, the valve-rod extending through one of the hubs of said cylinder, the bell-crank lever connected with the inner end of said valve-rod, the link connected with said bell-crank lever and said valve, and the wheel engaging the threaded end of said valve-rod for controlling the movement of the latter and said valve; substantially as set forth.

5. In a roaster, the revoluble cylinder having an inlet and an outlet for the material to be roasted, the casing within which said cylinder is mounted, and the pinion-wheel connected with the hub of said cylinder for imparting motion to the latter, combined with the power-shaft having the worm in engagement with said pinion, the clutch for connecting said worm with said shaft or disconnecting the same therefrom, the crank-wheel on the end of said shaft, the suction-pump connected with said crank-wheel, and the pipe leading to said pump and communicating with the interior of said cylinder, said cylinder except at its connection with the suction-conduit being substantially sealed or airtight; substantially as set forth.

6. In a roaster, the revoluble cylinder having an inlet and an outlet for the material to be treated, and the casing within which said cylinder is mounted and adapted to revolve, one end of said cylinder having the hollow hub K and sleeve X, combined with means engaging said hollow hub K for revolving said cylinder, the dome *a* connected with said sleeve X, the valve-rod extending through said sleeve X, the valve controlling the outlet from said cylinder and connected with said valve-rod, and means for controlling said valve-rod; substantially as set forth.

7. In a roaster, the roasting-cylinder having an inlet and an outlet for the material to be treated, and the casing within which said cylinder is mounted and adapted to revolve, one end of said cylinder having the hollow hub K and sleeve X, combined with the stationary sleeve *k* connected with said hub K, means connected with said hub K for revolving said cylinder, the valve-rod extending through said sleeve $k$, hub K, and sleeve X, the valve controlling the outlet from said cylinder and connected with said valve-rod, means for controlling said valve-rod, and suction apparatus connected with said stationary sleeve $k$ and communicating with the interior of said cylinder A; substantially as set forth.

Signed at New York, in the county of New York and State of New York, this 11th day of April, A. D. 1899.

WILLIAM WALTER.

Witnesses:
CHAS. C. GILL,
E. JOS. BELKNAP.